United States Patent [19]
Batttles et al.

[11] Patent Number: 6,045,770
[45] Date of Patent: Apr. 4, 2000

[54] SULFUR DIOXIDE GENERATION USING GRANULATED OR EMULSOID SULFUR FEEDSTOCK

[75] Inventors: Richard L. Batttles, New Palestine, Ind.; Kent S. Duncan, deceased, late of St. Louis, Mo., by Debra C. Duncan, legal representative; David L. Woracek, Federal Way, Wash.; Michael J. Lentz, Indianapolis, Ind.

[73] Assignee: Wilhelm Environmental Technologies, Indianapolis, Ind.

[21] Appl. No.: 08/204,208

[22] PCT Filed: Mar. 4, 1994

[86] PCT No.: PCT/US94/01973

§ 371 Date: Jun. 3, 1997

§ 102(e) Date: Jun. 3, 1997

[87] PCT Pub. No.: WO94/20414

PCT Pub. Date: Aug. 15, 1994

Related U.S. Application Data

[63] Continuation-in-part of application No. 08/031,819, Mar. 12, 1993, abandoned.

[51] Int. Cl.[7] .................................................. C01B 17/54
[52] U.S. Cl. .......................... 423/543; 422/160; 422/161; 422/164; 423/539; 423/533; 423/532
[58] Field of Search .................................... 422/160, 161, 422/164; 423/543, 539, 511, 532, 533; 23/293 S, 294 S; 210/192; 55/106; 95/60; 96/52

[56] References Cited

U.S. PATENT DOCUMENTS

| | | | |
|---|---|---|---|
| 3,723,068 | 3/1973 | McIlroy et al. | 423/543 |
| 3,907,510 | 9/1975 | Collins | 23/278 |
| 3,948,774 | 4/1976 | Lindman | 210/192 |
| 4,286,966 | 9/1981 | Kirby et al. | 23/293 S |
| 4,548,789 | 10/1985 | Ballestra | 422/160 |
| 5,032,154 | 7/1991 | Wright | 55/106 |
| 5,229,077 | 7/1993 | Bell et al. | 422/168 |

OTHER PUBLICATIONS

Verakis and Nagy, "Dust Explosions", Mark's Standard Handbook for Mechanical Engineers, p. 7–25, 7–32 (8th ed.), 1978.

*Primary Examiner*—Tom Dunn
*Attorney, Agent, or Firm*—Ice Miller Donaido & Ryan; Jay G. Taylor; Russell E. Fowler, II

[57] ABSTRACT

A flue gas conditioning system (FGC) for conditioning the flue gas flowing in a flue from a boiler to an electrostatic precipitator by injecting sulfur trioxide into the flue gas upstream of the electrostatic precipitator. The FGC has a source (52) of granulated sulfur which is transported by a conveyor (54) to a sulfur furnace (60) where it is combusted in sulfur dioxide. The sulfur dioxide flows from the sulfur furnace (60) into a catalytic converter 62 which generates sulfur trioxide therefrom. The sulfur trioxide flows from the catalytic converter 62 into probes 64 which are mounted in the flue duct. Alternatively, the FGC has a source (70) of emulsoid sulfur which is pumped by a sulfur pump (72) to the inlet of an atomizing spray nozzle (200) which atomizes the emulsoid sulfur and sprays it into sulfur furnace (50).

18 Claims, 4 Drawing Sheets

6,045,770

1

SULFUR DIOXIDE GENERATION USING GRANULATED OR EMULSOID SULFUR FEEDSTOCK

This is a 371 of PCT/US94/01973 filed Mar. 4, 1994 and a continuation-in-part application of U.S. Ser. No. 08/031,819 filed Mar. 12, 1993 for a sulfur trioxide flue gas conditioning system with granulated sulfur or emulsoid sulfur feedstock now abandoned.

TECHNICAL FIELD

This invention relates to methods and apparatuses for generating gaseous sulfur dioxide by combusting sulfur, and more particularly, to a method and apparatus for generating gaseous sulfur dioxide by combusting a granulated sulfur or emulsoid sulfur feedstock.

BACKGROUND ART

Sulfur dioxide is used as an intermediate in a number of different applications, including sulphonation, the generation of sulfuric acid, and to produce sulfur trioxide in electrostatic flue gas conditioning systems which use sulfur trioxide as a flue gas conditioning agent. Electrostatic flue gas conditioning systems are used to condition the exhaust flue gas of coal burning systems, such as coal fired electric generating systems, to enhance the efficiency of the electrostatic precipitator in removing particulate matter, such as fly ash, from the flue gas. Typically, in an electrostatic flue gas conditioning system, elemental sulfur is combusted or burned to generate sulfur dioxide ($SO_2$). The $SO_2$ is then catalyzed to convert it into sulfur trioxide ($SO_3$). The $SO_3$ is then injected into an electrostatic precipitator to condition the flue gas passing therethrough to enhance the efficiency of the electrostatic precipitator in removing particulate matter from the flue gas. Such a $SO_3$ flue gas conditioning system is disclosed in U.S. Pat. No. 5,032,154.

Heretofore, elemental sulfur has been used as a source of sulfur which is combusted to generate $SO_2$. Elemental sulfur is sulfur in its molten state. While it is inexpensive and does not readily burn, it has a number of characteristics which make it difficult to handle and store.

Elemental sulfur is delivered molten at about 280° F. and must be kept at or near this temperature for successful pumping and handling. The viscosity of sulfur varies greatly with temperature. Below about 260° F. the viscosity of sulfur increases quickly so that it can no longer be pumped by conventional means. Above about 300° F., sulfur polymerizes into a toothpaste-like consistency and again cannot be pumped by conventional means. Elemental sulfur also has trace amounts of hydrogen sulfide which must be vented to atmosphere. Elemental sulfur also sublimates (changes from a solid to a gas and back to a solid) so that all elemental sulfur storage equipment must be steam jacketed to prevent sulfur crystal accumulations.

For these reasons, elemental sulfur storage and handling systems must be carefully designed to keep the elemental sulfur molten by keeping it within a very narrow temperature range of 270° F.–290° F. $SO_3$ flue gas conditioning systems which use elemental sulfur as the feedstock typically store the molten elemental sulfur in insulated steel tanks or concrete pits. This storage vessel is heated, usually by steam coils installed in the bottom of the storage vessel. The steam coils are typically formed in a U-shape so condensate is formed in the coils as the steam cools. Thus, the elemental sulfur storage vessel must have provisions for a steam supply and for condensate disposal to a drainage facility.

2

Elemental sulfur storage vessels are also exposed to attack from small quantities of sulfuric acid which forms on the surface of the sulfur. Although rare, this occasionally necessitates repairs which are costly, time consuming, and carry the risk of fire.

When the elemental sulfur is pumped from the storage vessel to the sulfur furnace, where it is combusted to form $SO_2$, its temperature must be kept within the above described narrow range of 270° F.–290° F. Consequently, the elemental sulfur is typically pumped through steam jacketed piping with close temperature control maintained. To maintain the elemental sulfur at the proper temperature throughout the steam jacketed piping, steam must typically be introduced at several points and condensate must also be drained from several points. Steam jacketed sulfur piping lines must also allow for pipe expansion. As a result, steam jacketed sulfur piping lines are expensive.

Elemental sulfur is unloaded into the storage vessel from a truck or rail car by the use of steam jacketed pumps which often include steam jacketed hoses. Further, although delivered "molten," the elemental sulfur often has cooled to the point where it is too viscous to be pumped properly. Steam must therefore be made available to the truck or rail car for heating the elemental sulfur to proper pumping temperatures as well as for the steam jacketed pumps and hoses used to unload the elemental sulfur.

The elemental sulfur is pumped from the storage vessel to the sulfur furnace by steam jacketed reciprocating pumps or submerged gear pumps. The reciprocating pumps require piping with check valves to prevent sulfur from flowing back during return strokes of the pump. These pumps also tend to leak because sulfur flows from all but the tightest pump joints. Hydrocarbons in the sulfur also tend to the clog the pumps and check valves. The pumping systems thus require significant maintenance on a periodic basis and tend to be the major maintenance item in sulfur based flue gas conditioning systems. Submerged gear pump assemblies have the gear pump submerged in the elemental sulfur and eliminate much of the maintenance problem. However, submerged gear pumps also require periodic maintenance.

The temperature of the various components of the elemental sulfur feedstock system must be carefully maintained to prevent minor temperature fluctuations which would quickly stop sulfur flow. As mentioned, such temperature control is achieved by the use of steam heating coils, steam pumps, and steam jacketed piping.

Although the amount of steam required by such elemental sulfur feedstock systems is relatively small, in the order of fifty to four hundred pounds per hour, saturated steam is usually not available in electric power generating plants. Consequently, the steam must be obtained by de-superheating high quality steam from turbine bleed systems or by the use of a separate boiler. In either case, such system steam, and often the condensate, is expensive and one of the major cost factors that is evaluated by a potential user of a $SO_3$ flue gas conditioning system in deciding whether to install such a system.

It is therefore an objective of this invention to eliminate the disadvantages attendant with the use of an elemental sulfur feedstock system, such as are used in $SO_3$ flue gas conditioning systems, by using granulated sulfur or emulsoid sulfur as the feedstock for the sulfur which is combusted to generate $SO_2$.

SUMMARY OF THE INVENTION

In a method and apparatus in accordance with the invention, sulfur dioxide is generated by combusting sulfur in a sulfur furnace. The sulfur combusted is provided in either granulated or emulsoid form to the sulfur furnace.

In an embodiment of the invention, a $SO_3$ flue gas conditioning system has a sulfur burner or furnace for combusting sulfur supplied by a sulfur feedstock system into $SO_2$, a catalytic converter for catalyzing the $SO_2$ into $SO_3$, and means for injecting the $SO_3$ into an electrostatic precipitator. The sulfur feedstock system can be a granulated sulfur feedstock system which supplies granulated sulfur to the sulfur burner or an emulsoid sulfur feedstock system which supplies emulsoid sulfur to the sulfur burner.

Additional features and advantages of the invention will become apparent to those skilled in the art upon consideration of the following detailed description of preferred embodiments of the invention, exemplifying the best modes of carrying out the invention as presently perceived. The detailed description particularly refers to the accompanying figures in which:

BEST MODES FOR CARRYING OUT THE INVENTION

Figure 1:
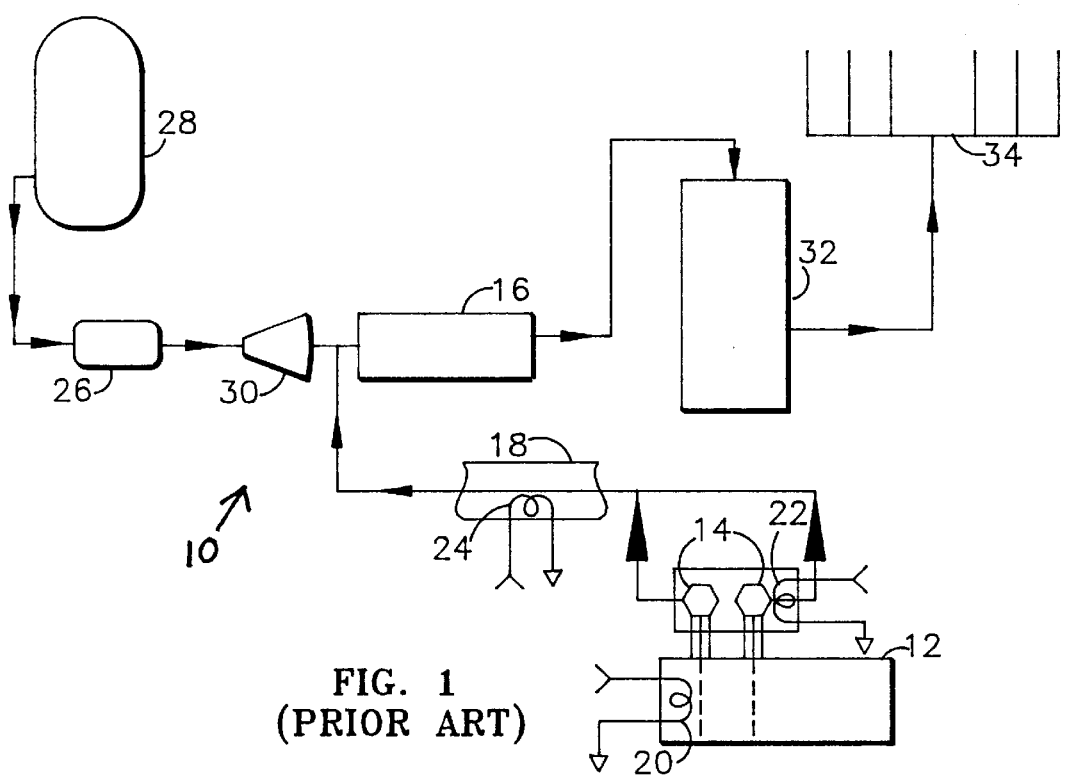
FIG. 1 is a schematic of a prior art $SO_3$ flue gas conditioning system.

Referring to FIG. 1, a prior art $SO_3$ flue gas conditioning system 10 is shown. Flue gas conditioning system 10 has a storage vessel 12, such as a pit or a tank, for storing elemental sulfur. Sulfur pump or pumps 14 are coupled to storage tank 12 and pump elemental sulfur out of tank 12 to the inlet of a sulfur furnace 16 through a steam jacketed pipe 18. Tank 12, pump(s) 14 and steam jacketed pipe 18 are heated by steam coils 20, 22, 24, respectively, which are coupled to a source of steam (not shown).

Flue gas conditioning system 10 also has a process blower 26 having an inlet coupled to a bag house or air filter 28 and an outlet coupled to an inlet of a heater 30. An outlet of heater 30 is coupled to the inlet of sulfur furnace 16. An outlet of sulfur furnace 16 is coupled to an inlet of catalytic converter 32 and an outlet of catalytic converter is coupled to probes 34. Probes 34 are mounted in an electrostatic precipitator (not shown) of an electrostatic flue gas pollution control system (not shown).

In operation, elemental sulfur is pumped from tank 12 by pump(s) 14 through steam jacketed pipe 18 to the inlet of sulfur furnace 16. The temperature of tank 12, pump(s) 14 and steam jacketed pipe 18 is appropriately controlled by the use of steam coils 20, 22, 24 to maintain the temperature of the elemental sulfur between 270° F.–290° F. to keep it in its proper molten state so that it can be pumped.

Process blower 26 draws air in through bag house 28, which filters the air, and forces it into heater 30 and then into sulfur furnace 16. The heated air contacts the elemental sulfur in sulfur furnace 16 which combusts the elemental sulfur. The combustion of the elemental sulfur generates $SO_2$ which is forced from the outlet of sulfur furnace 16 into the inlet of catalytic converter 32. Catalytic converter 32 catalyzes the $SO_2$ into $SO_3$ which then flows from an output of catalytic converter 32 into probes 34 which injects the $SO_3$ into the electrostatic precipitator (not shown) for conditioning the flue gas flowing through the electrostatic precipitator. Flue gas conditioning system is described in more detail in U.S. Pat. No. 5,032,154, owned by Wilhelm Environmental Technologies, Inc., the owner of this application. U.S. Pat. No. 5,032,154 is incorporated by reference herein.

Figure 2:
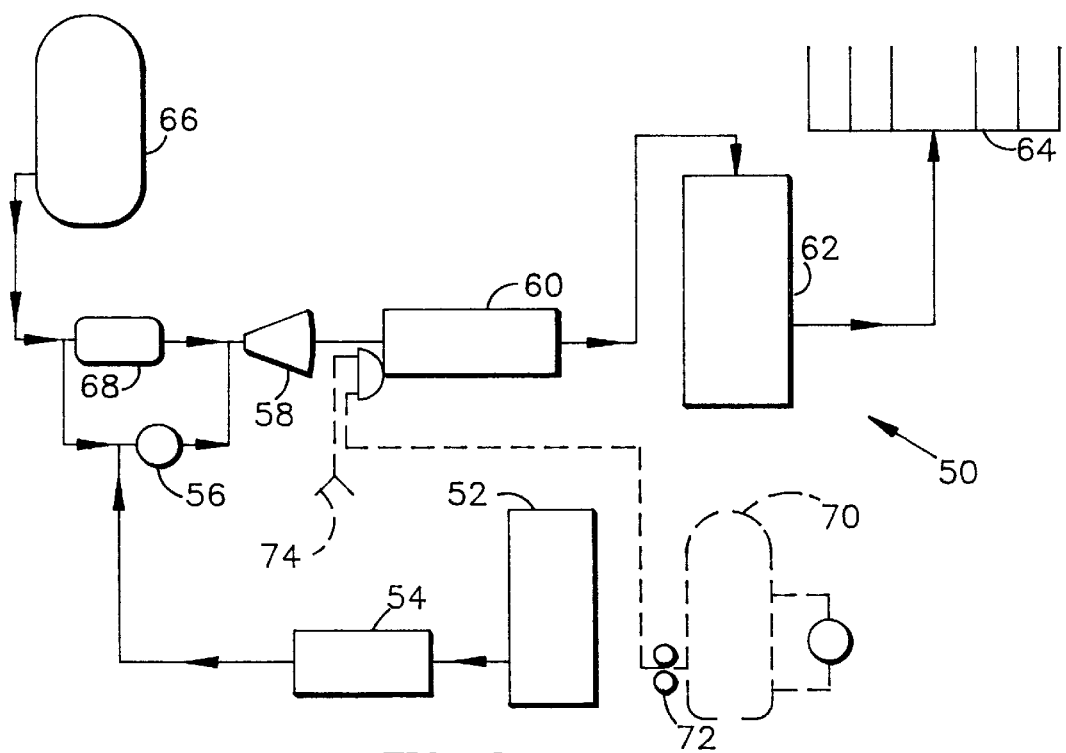
FIG. 2 is a schematic of a $SO_3$ flue gas conditioning system in accordance with this invention.

Referring to FIG. 2, a $SO_3$ flue gas conditioning system 50 according to this invention is shown. Flue gas conditioning system 50 includes a source of granulated sulfur 52. As used herein, "granulated sulfur" means solid sulfur in particulate form such as powder or granules. The granulated sulfur can be powdered sulfur, flake sulfur, prill, BB's, pellets, or the like.

Since sulfur dust can explode, granulated sulfur source 52 preferably includes an inerting system to prevent explosions such as a carbon dioxide or nitrogen inerting system. Illustratively, granulated sulfur source 52 is a nitrogen or carbon dioxide inerting tank in which granulated sulfur is stored such as the inerting tank sold by Jim Pyle, Production Design Co., Box 462, 544 Aspen Hall, Harrodsburg, Ky. 40330, under the trade name Transilo. However, depending on the type of granulated sulfur used, inerting may not be required. For example, granulated sulfur in the form of prill, BB's, pellets and flakes forms less sulfur dust than does powdered sulfur and granulated sulfur in this form may not require inerting.

A conveyor 54, which is illustratively a precision insulated screw conveyor, carries granulated sulfur from granulated sulfur source 52 to an inlet of a sulfur exhauster 56. Sulfur exhauster 56 is illustratively a small blower capable of handling granulated sulfur. Sulfur exhauster 56 forces the granulated sulfur into an inlet of heater/burner 58. An outlet of heater/burner 58 is coupled to an inlet of sulfur furnace 60 and an outlet of sulfur furnace 60 is coupled to an inlet of catalytic converter 62. An outlet of catalytic converter 62 is coupled to probes 64 which are mounted in an electrostatic precipitator (not shown) of an electrostatic flue gas pollution control system (not shown).

Flue gas conditioning system 50 also has a bag house or air filter 66 having an outlet coupled to an inlet of a process blower 68 and to an inlet of sulfur exhauster 56. An outlet of process blower 68 is coupled to an inlet of heater/burner 58.

Flue gas conditioning system 50 operates in much the same way as the flue gas conditioning system 10 shown in FIG. 1 except granulated sulfur is used as the sulfur feedstock instead of elemental sulfur. Conveyor 54 carries the granulated sulfur from granulated sulfur source 52 to the inlet of sulfur exhauster 56. Sulfur exhauster 56 forces the granulated sulfur into heater/burner 58 where it is mixed with air blown into heater/burner 58 by process blower 68. Process blower 68 draws air in from the outside through bag house or air filter 66.

The granulated sulfur is blown into heater/burner 58 by the air flow from process blower 68 and then into sulfur furnace 60 where it combusts into $SO_2$. The $SO_2$ then flows from sulfur furnace 60 into catalytic converter 62 which catalyzes the $SO_2$ into $SO_3$. The $SO_3$ flows into probes 64 which inject it into the electrostatic precipitator (not shown) for conditioning the flue gas flowing through the electrostatic precipitator.

Figure 5:
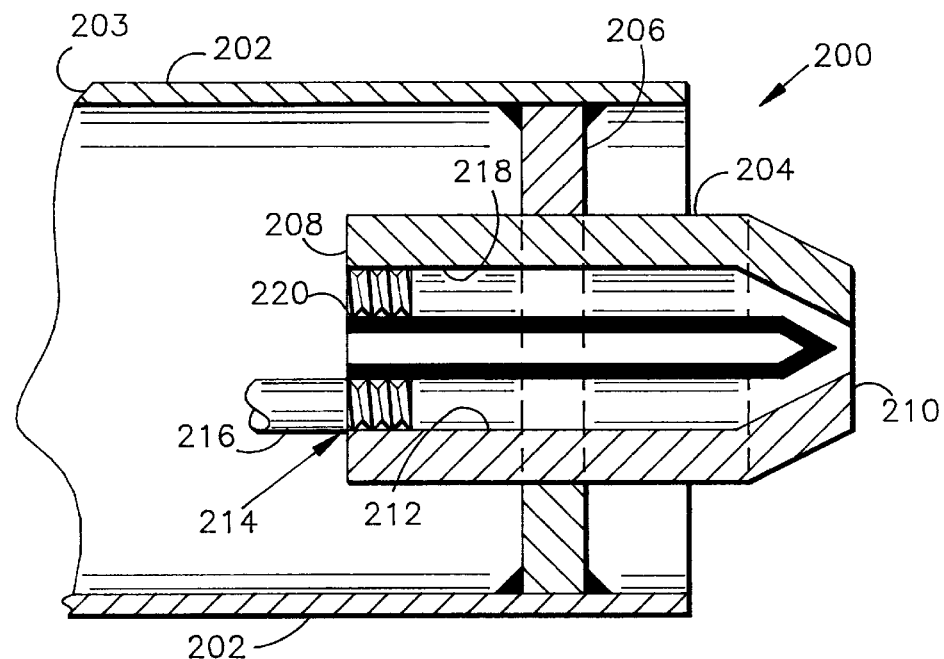
FIG. 5 is a side cross-sectional view of a nozzle for the sulfur furnace of FIG. 3 for use with an emulsoid sulfur feedstock system.

An emulsoid sulfur feedstock system, which can be used as an alternative to the granulated sulfur feedstock system, is shown by dashed lines in FIG. 2. The emulsoid sulfur feedstock system includes a source 70 of emulsoid sulfur, which can be a tank, having a sulfur pump 72 coupled to an outlet thereof. An outlet of sulfur pump 72 is coupled to an inlet of an atomizing spray nozzle 200 (FIG. 5) of sulfur furnace 60. A source 74 of atomizing air is also coupled to an inlet of atomizing spray nozzle 200 (FIG. 5).

In operation, emulsoid sulfur is pumped by sulfur pump 72 from emulsoid sulfur source 70 to the inlet of atomizing spray nozzle 200 of sulfur furnace 60 where it is mixed with atomizing air and sprayed out into sulfur furnace 60 where it mixes with hot combustion air. Process blower 68 draws air in through bag house 66 and forces it through heater/burner 58, which heats it, into sulfur furnace 60. The emulsoid sulfur combusts into $SO_2$ in sulfur furnace 60 which is then catalyzed into $SO_3$ by catalytic converter 62 for injection into the electrostatic precipitator (not shown) by probes 64.

Figure 3:
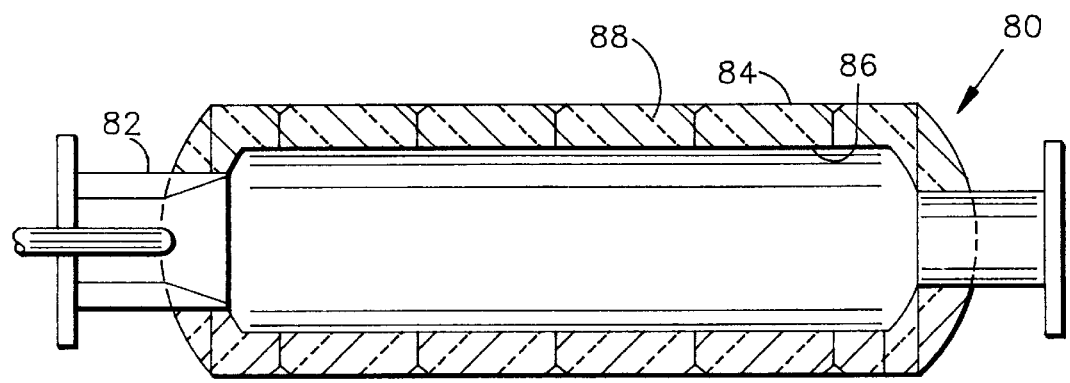
FIG. 3 is a side cross-sectional view of a sulfur furnace for a $SO_3$ flue gas conditioning system according to this invention.

Referring to FIG. 3, a sulfur furnace 80 is shown which can preferably be used in the $SO_3$ flue gas conditioning system 50 of FIG. 2. Sulfur furnace 80 includes a nozzle 82 where sulfur is mixed with combustion air and begins the combustion process. Illustratively, nozzle 82 is either a nozzle for a granulated sulfur feedstock, such as nozzle 100 (FIG. 4), or a nozzle for emulsoid sulfur feedstock, such as atomizing nozzle 200 (FIG. 5).

Furnace 80 comprises an outer shell or casing 84 and an inner shell or casing 86 having a refractory lining 88 disposed therebetween. Illustratively, outer casing 84 is made of a schedule 40 mild steel and inner casing 86 is made from a 20 gauge mild steel. The refractory lining is illustratively a castable lining which is pumped into place between inner casing 86 and outer casing 84, vibrated into place and heat treated to produce a long wearing monolithic refractory surface. Outer casing 84 is illustratively insulated for personnel protection.

Figure 4:
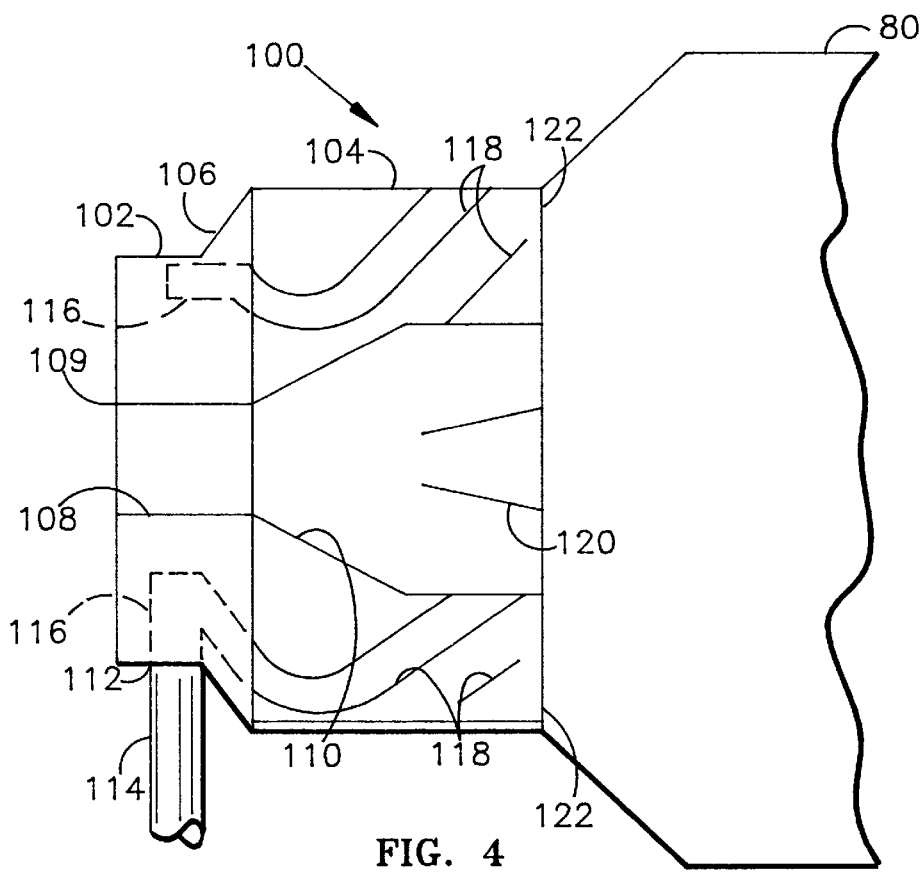
FIG. 4 is a side cross-sectional view of a nozzle for the sulfur furnace of FIG. 3 for use with a granulated sulfur feedstock system.

Referring to FIG. 4, nozzle 100 for granulated sulfur feedstock is shown. Nozzle 100 has a first or inlet ring section 102 and a second or outlet ring section 104 having a larger diameter than inlet ring section 102, and a sloped shoulder section 106 therebetween. Inlet ring section 102 and sloped shoulder section 106 have a cylindrical combustion air passageway 108 extending axially through their center and which expands outwardly in outlet ring section 104 to a generally conical throat 110 which opens to the interior of sulfur furnace 80. Cylindrical combustion air passageway has an inlet 109 which is coupled to the outlet of process blower 68 (FIG. 2). Nozzle 100 has a granulated sulfur inlet 112 which is coupled to the outlet of sulfur exhauster 56 (FIG. 2) by pipe 114. Inlet 112 opens to a passageway 116 formed in inlet ring section 102. Passageway 116 communicates with swirl or cyclone passageways 118 formed in outlet ring section 104 surrounding throat 110. Passageways 118 open to the interior of sulfur furnace 80 at 122. An oil or gas burner 120 is mounted at generally the center of throat 110 in outlet ring section 104 at the interface between nozzle 100 and sulfur furnace 80. In this embodiment, sulfur furnace 80 with nozzle 100 combines the functions of heater/burner 58 and sulfur furnace 60 of FIG. 2.

In operation, combustion air is blown into inlet 109 of cylindrical passageway 108 by process blower 68 (FIG. 2) and forced through passageway 108 into generally conical throat section 110 where it is heated by burner 120 and flows out into the interior of sulfur furnace 80. Granulated sulfur is blown into passageway 116 in inlet ring section 102 through inlet 112 by sulfur exhauster 56 (FIG. 2). The granulated sulfur is forced through passageway 116 into swirl or cyclone passageways 118 in outlet ring section 104 which impart a swirl or cyclone effect to the granulated sulfur so that it is swirling as it flows out of passageways 118 into the interior of sulfur furnace 80. When the granulated sulfur flows into furnace 80, it contacts the hot combustion air that has been heated by burner 120 and combusts at generally the interface between nozzle 100 and furnace 80 into $SO_2$.

Referring to FIG. 5, atomizing nozzle 200 for use with emulsoid sulfur feedstock is shown. Atomizing nozzle 200 has an outer hollow cylindrical case 202, an inner cylindrical spray head 204, and a web section 206 extending between outer case 202 and cylindrical spray head 204 to hold cylindrical spray head 204 in place in outer cylindrical case 204. Web section 206 includes passageways (not shown) which extend therethrough to allow combustion air to flow through outer cylindrical case 202 around spray head 204 into the interior of sulfur furnace 80. Outer, hollow cylindrical case 202 has an inlet 203 which is coupled to the outlet of heater/burner 58 (FIG. 2).

Cylindrical spray head 204 has an inlet end 208 and an outlet end 210. An emulsoid sulfur passageway 212 extends from an emulsoid inlet 214 in inlet end 208 through cylindrical spray head 204 to outlet end 210. Emulsoid inlet 214 is coupled by a pipe 216 to sulfur pump 72 (FIG. 2). An atomizing air passageway 218 extends from an atomizing air inlet 220 in inlet end 208 through cylindrical spray head 204 to outlet end 210. Atomizing air inlet 220 is coupled to the source of atomizing air 74 (FIG. 2). Atomizing air passageway 218 and emulsoid sulfur passageway 212 join at the outlet end 210 of cylindrical spray head 204 and open into the interior of sulfur furnace 80.

In operation, emulsoid sulfur is pumped from emulsoid sulfur source 70 by sulfur pump 72 into emulsoid sulfur passageway 212 in spray head 204 of nozzle 200 through emulsoid sulfur inlet 214. Atomizing air is blown by atomizing air source 74 (FIG. 2) into atomizing air passageway 218 in spray head 204 through atomizing air inlet 220. Hot combustion air, which has been heated by heater/burner 58, flows into inlet 203 in outer casing 202 of nozzle 200. The hot combustion air flows through outer casing 202 around spray head 204 and out into sulfur furnace 80. The atomizing air and emulsoid sulfur mix at the outlet end 210 of spray head 204 and the atomizing air/emulsoid sulfur mixture is sprayed by spray head 204 out into sulfur furnace 80 where it contacts the hot combustion air which causes the sulfur particles in the emulsoid sulfur to combust as well as evaporating the water in the emulsoid sulfur. The sulfur particles combust into $SO_2$ which then flows from sulfur furnace 80 into catalytic converter 62 (FIG. 2) which catalyzes the $SO_2$ into $SO_3$. The $SO_3$ is then injected into the electrostatic precipitator (not shown) of the electrostatic flue gas pollution control system (not shown) by probes 64 (FIG. 2).

Figure 6:
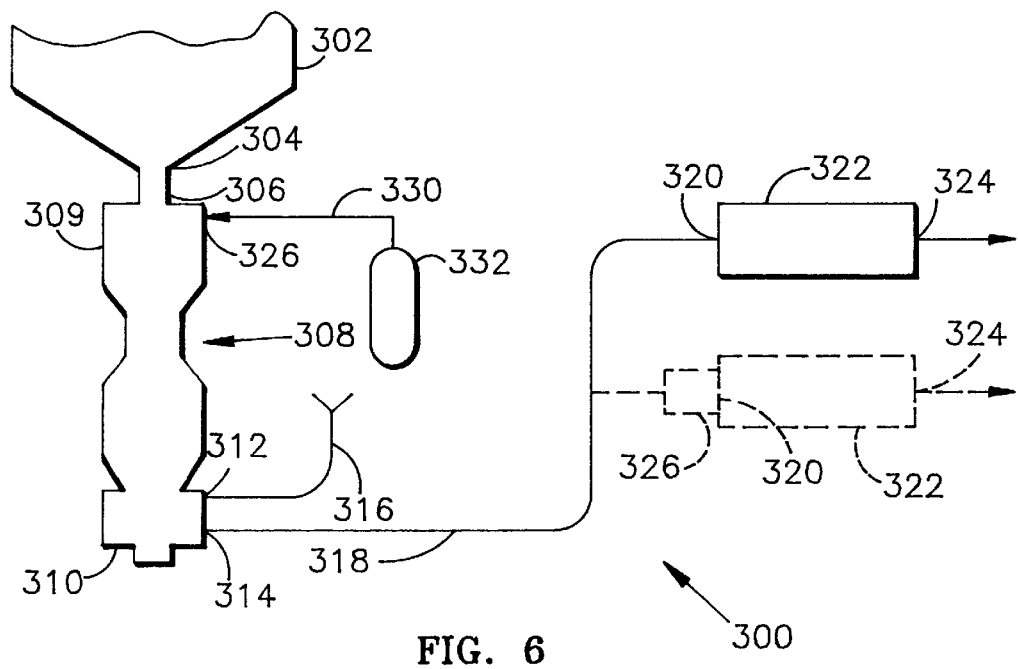
FIG. 6 is a schematic of a system for generating sulfur dioxide in accordance with the invention.

Referring to FIG. 6, a system 300 for generating sulfur dioxide in accordance with the invention is shown. Sulfur dioxide generating system 300 includes a source of granulated sulfur, such as hopper 302 in which granulated sulfur is held. Hopper 302 can illustratively be a Transilo inerting tank sold by Jim Pyle, Production Design Co., Box 462, 544 Aspen Hall, Harrodsburg, Ky. 40330. However, if inerting of the granulated sulfur is not required, hopper 302 can be a hopper or silo of conventional design for holding granulated material.

Hopper 302 has an outlet 304 coupled to an inlet 306 of a pneumatic feed unit 308. Pneumatic feed unit 308 is illustratively a RotoFeed® pneumatic conveying unit manufactured by Simon Air Systems, P.O. Box 326, Milford, Ohio 45150. Pneumatic feed unit 308 has a pneumatic feeder 310 having a conveying air inlet 312 coupled to a source of compressed air (not shown) by air line 316. Pneumatic feeder 310 of pneumatic feed unit 308 has a material outlet 314 coupled by pipe 318 to an inlet 320 of a sulfur furnace 322.

In operation, granulated sulfur is stored in hopper 302. Illustratively, pneumatic feed unit 308 is mounted to the bottom of hopper 302 with its inlet 306 coupled to the outlet 304 of hopper 302 so that granulated sulfur is fed into pneumatic feed unit 308 by gravity or by gravity assist. Pneumatic feeder 310 of pneumatic feed unit 308 pneumatically feeds the granulated sulfur to sulfur furnace 322. Illustratively, pneumatic feeder 310 blows the granulated sulfur through pipe 318 at a rate of about 4 CFM which is sufficiently fast to eliminate any explosion hazard which might be caused by sulfur dust.

Sulfur furnace 322 combusts the granulated sulfur fed to it by pneumatic feed unit 308 which generates sulfur dioxide. The sulfur dioxide flows out of sulfur furnace 322 through an outlet 324 of sulfur furnace 322.

Depending on the type of granulated sulfur used, hopper 302 and pneumatic feed unit 308 may require inerting. If inerting is required, then a Transilo tank discussed above can be used as hopper 302. Pneumatic feed unit 308 then preferably has an inert gas inlet 326 coupled by a pipe 330 to a source of inert gas, such as a tank of nitrogen 332.

Sulfur furnace 322 can be any sulfur furnace which can combust granulated sulfur. For example, sulfur furnace 322 can be sulfur furnace 80 shown in FIG. 3 or sulfur furnace 400 shown in FIG. 7.

A modification to system 300 is shown in phantom in FIG. 6 in which the granulated sulfur is pulverized into finely divided sulfur, e.g., 300 mesh, immediately before the sulfur is introduced into furnace 322. In this modified embodiment, a pulverizer 326 is coupled between pipe 318 and inlet 320 of sulfur furnace 322. Illustratively, pulverizer 326 is mounted to the inlet 320 of sulfur furnace 322. Granulated sulfur supplied through pipe 318 is introduced into pulverizer 326 which pulverizes it into finely divided sulfur (300 mesh). The pulverized sulfur is then introduced into sulfur furnace 322 where it combusts. Pulverizer 326 can illustratively be commercially available ball or ring pulverizes of small capacity, e.g., 10–200 pounds/hour. Such a pulverizer can be an Atritor Cell Mill model 250 manufactured by Allis Mineral Systems Division of Kennedy Van Saun, 350 Railroad Street, Danville, Pa., U.S.A. 17821-2046. By pulverizing the granulated sulfur before it is introduced into furnace 322, granulated sulfur in any commercial form, such as flake, prill, pellet or BB's can be stored and conveyed to the pulverizer 326. The pulverized sulfur flows, illustrativley by pneumatic conveyance, from the pulverizer 326 into furnace 322 at a rate sufficient so as to eliminate the risk of explosion due to sulfur dust. A day hopper, such as described below with reference to FIG. 8, may be provided in proximity to the pulverizer wherein the granulated sulfur is fed to the day hopper and the day hopper provides the granulated sulfur to pulverizer 326 for pulverizing. Pulverizing the granulated sulfur before introduction into the sulfur furnace is advantageous in that the finely divided sulfur produces the most vigorous flame and requires the smallest furnace envelope, resulting in improved process economies.

Figure 7:
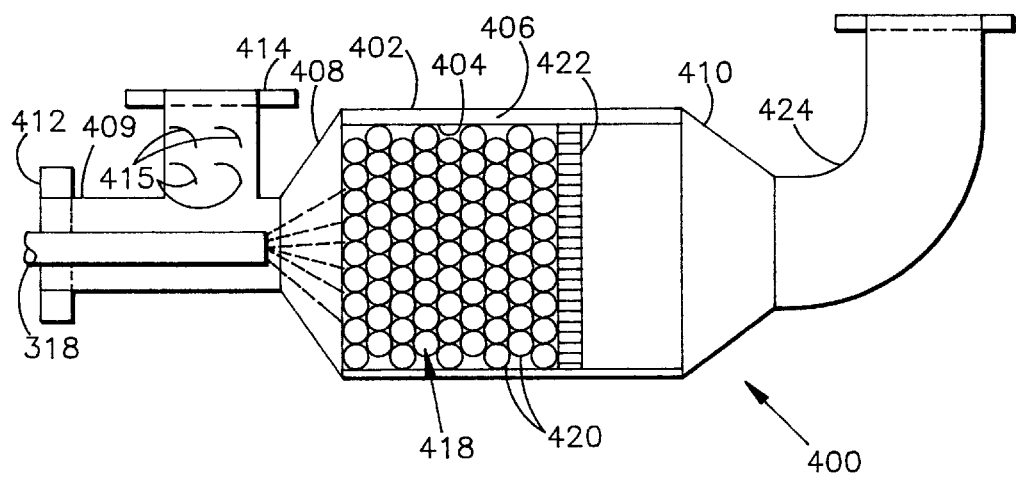
FIG. 7 is a side, generally cross-sectional view of a sulfur furnace which can be used in the system of FIG. 6.

FIG. 7 shows a sulfur furnace 400 which can be used for sulfur furnace 122 of FIG. 6, or for sulfur furnace 60 of FIG. 2. Sulfur furnace 400 is illustratively a spherical array checker work sulfur furnace and comprises an outer shell or casing 402 and an inner casing or shell 404 having a refractory lining 406, such as ceramic, therebetween. Illustratively, outer shell 402 is made of a schedule 40 mild steel and inner shell 404 is made from a 20 gauge mild steel. Refractory lining 406 can illustratively be a castable lining such as described above with regard to lining 86 of furnace 80 (FIG. 3). Outer casing 402 is illustratively insulated for personnel protection.

Furnace 400 further has an inlet 408 and an outlet 410. Inlet 408 illustratively has a six inch pipe "T" 409 affixed thereto having a sulfur inlet end 412 and a hot gas inlet end 414. Hot gas inlet end 414 is coupled to a source of hot gas, such as heater 58 (FIG. 2). Hot gas inlet end 414 illustratively has baffles 415 affixed therein for imparting a swirl or cyclonic effect to the hot gas flowing thereinto. Pipe 318 (FIG. 6), which is coupled to the material outlet 314 of pneumatic feed unit 308, extends into pipe "T" 409 through sulfur inlet end 412 to the inlet 408 of sulfur race 400.

Furnace 400 further incudes a checker work array 418 of ceramic balls 420 disposed therein. Illustratively, a stainless steel grate 422 extends transversely across the interior of furnace 400 and holds the checker work array 418 of ceramic balls 420. Ceramic balls 420 are illustratively two inch ceramic balls. Although furnace 400 is shown horizontally in FIG. 7, it is preferably mounted vertically in actual use.

In operation, granulated sulfur is supplied by pipe 318 to the inlet 408 of furnace 400 where it is blown into the interior of furnace 400 against ceramic balls 420. Hot gas is introduced to the interior of furnace 400 through hot gas inlet 414 of pipe "T" 409. Baffles 415 impart a swirl or cyclonic effect to the hot gas which aids in dispersing the granulated sulfur against ceramic balls 420 in the interior of furnace 400. The hot gas raises the temperature of the ceramic balls 420 to a sufficient level to combust the granulated sulfur. The granulated sulfur combusts after being blown onto the surfaces of ceramic balls 420 and generates sulfur dioxide. After furnace 400 has been combusting the granulated sulfur for a sufficient period of time, the heat generated by the combustion of the granulated sulfur is sufficient to maintain combustion so that hot gas no longer need be introduced through hot gas inlet 414 of pipe "T" 409. The gaseous sulfur dioxide exits through outlet 410 of furnace 400 and through pipe 424 which is coupled to moutlet 410. Pipe 424 is illustratively an eight inch pipe.

Figure 8:
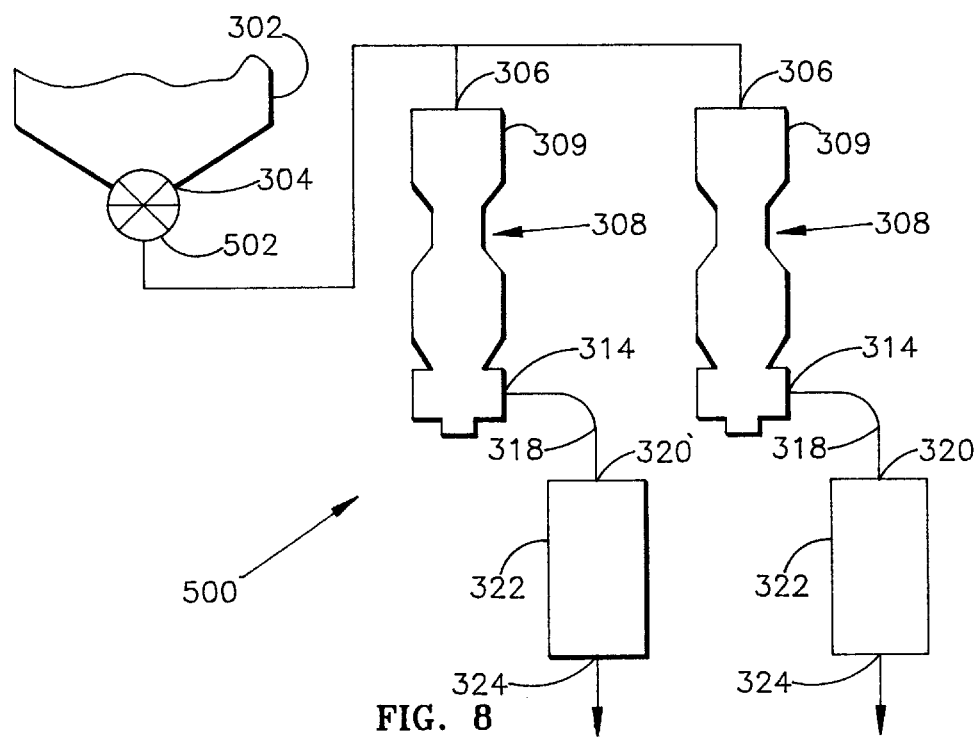
FIG. 8 is a schematic of a system for generating sulfur dioxide at multiple locations in accordance with the invention.

FIG. 8 is a schematic of a system 500 for generating sulfur dioxide at multiple locations according to the invention. System 500 is a modification of system 300 of FIG. 3 and like elements are identified with like reference numbers. System 500 includes hopper 302 having its outlet 304 coupled to an inlet of a conveyor 502. Conveyor 502 is illustratively a dense phase conveyor such as a Model DPG-1B Cyclonaire Bottom Discharge Dense Phase Conveyor, manufactured by Cyclonaire, Box 366, York, Nebr. 68467, or a Densairveyor manufactured by Simon Air Systems. An outlet of conveyor 502 is coupled to inlets 306 of pneumatic feed units 308. A storage hopper or day hopper is provided in proximity with each sulfur furnace 322 for holding a quantity of granulated sulfur such as might be used in one day. Illustratively, the storage hopper or day hopper is part of pneumatic feed unit 308 such as indicated by reference number 309. The material outlet 314 of each pneumatic feed unit 308 is coupled to a respective inlet 320 of a respective sulfur furnace 322. Sulfur furnaces 322 with their associated pneumatic feed units 308 can be located at different locations. Further, more than two sulfur furnaces 322 with associated pneumatic feed units 308 can be used in system 500, with the size of hopper 302 and conveyor 502 modified accordingly to accommodate the number of sulfur furnaces 322 and associated pneumatic feed units 308 included in system 500.

The use of solid granulated sulfur feedstock or emulsoid sulfur feedstock provides significant advantages over the use of elemental sulfur feedstock which has been heretofore been used to generate sulfur dioxide, such as in $SO_3$ flue gas conditioning systems. Emulsoid sulfur is a suspension of water and very fine sulfur particles on the order of four to six microns. The emulsion contains around seventy percent sulfur and thirty percent water which permits the emulsoid sulfur to be handled as a liquid. Moreover, the need for special steam heating of the type required with elemental sulfur is eliminated. All that is required is a simple heating system to keep the emulsoid sulfur from freezing such as heat tape disposed around emulsoid sulfur source 70 (FIG. 2). Further, because emulsoid sulfur is about thirty percent water, there is no risk of explosion. Similarly, the granulated sulfur feedstock, being a solid, eliminates the need for the special steam heating needed for elemental sulfur.

The granulated sulfur feedstock system and emulsoid sulfur feedstock system described herein can be advantageously used in any system which requires the generation of sulfur dioxide, such as in new sulfur trioxide flue gas conditioning systems and in the retrofit of existing sulfur trioxide flue gas conditioning systems by replacing the elemental sulfur feedstock system with the granulated sulfur feedstock system or emulsoid sulfur feedstock system of this invention.

Although the invention has been described in detail with reference to certain preferred embodiments, materials and specific examples, variations and modifications exist within the scope and spirit of the invention as described and as defined in the following claims.

What is claimed is:

1. A flue gas conditioning system for conditioning the flue gas flowing in a flue from a boiler to an electrostatic precipitator by injecting sulfur trioxide into the flue gas upstream of the electrostatic precipitator, comprising:
   a. a source of granulated sulfur;
   b. a sulfur furnace for combusting the granulated sulfur to generate gaseous sulfur dioxide;
   c. transport means coupled to the source of granulated sulfur and the sulfur furnace for transporting the granulated sulfur to the sulfur furnace;
   d. a catalytic converter coupled to the sulfur furnace for generating sulfur trioxide from the sulfur dioxide generated by the sulfur furnace, the catalytic converter receiving sulfur dioxide from the sulfur furnace at sufficient pressure to force the sulfur dioxide through the catalytic converter to generate sulfur trioxide; and
   e. a plurality of injection probes mounted in the flue duct upstream of the electrostatic precipitator and coupled to the catalytic converter for injecting the sulfur trioxide generated by the catalytic converter into the flue gas flowing through the flue duct.

2. The flue gas conditioning system of claim 1 and further including a source of process air coupled to the sulfur furnace and a heater for heating the process air so that it is at an appropriate temperature when it enters the sulfur furnace to cause the granulated sulfur to combust.

3. The flue gas conditioning system of claim 2 wherein the transport means comprises means for pneumatically conveying the granulated sulfur from the granulated sulfur source to the sulfur furnace.

4. The flue gas conditioning system of claim 3 and further including a pulverizer coupled to the sulfur furnace for pulverizing the granulated sulfur and injecting the pulverized sulfur into the sulfur furnace.

5. The flue gas conditioning system of claim 1 and further including a nozzle mounted at an inlet of the sulfur furnace, the nozzle having a body having an inlet coupled to the transport means, an outlet opening at the inlet of the sulfur furnace, and a swirl passageway formed in the nozzle body extending between the inlet and outlet in the nozzle body for imparting a swirl to the granulated sulfur as it flows through the swirl passageway such that the granulated sulfur is swirling as it enters the sulfur furnace from the outlet in the nozzle body.

6. The flue-gas conditioning system of claim 5 wherein the sulfur furnace includes an inner and outer shell having a refractory lining therebetween, the inner shell defining a cavity in which a checker work array of ceramic balls is disposed, the granulated sulfur dispersed against the ceramic balls as the granulated sulfur flows into the furnace and combusting thereon.

7. The flue gas conditioning system of claim 6 wherein the granulated sulfur source includes means for maintaining the granulated sulfur in an inert environment.

8. The flue gas conditioning system of claim 6 and further including a pulverizer coupled to the sulfur furnace for pulverizing the granulated sulfur and injecting the pulverized sulfur into the sulfur furnace.

9. The flue gas conditioning system of claim 1 wherein the granulated sulfur comprises sulfur in the form of any of powder, prill, flake, pellets, and BB's.

10. The flue gas conditioning system of claim 1 wherein the sulfur furnace includes an inner and outer shell having a refractory lining therebetween, the inner shell defining a cavity in which a checker work array of ceramic balls is disposed, the granulated sulfur dispersed against the ceramic balls as the granulated sulfur flows into the furnace and combusting thereon.

11. The flue gas conditioning system of claim 10 wherein the sulfur furnace has an inlet having an inlet pipe affixed thereto, the inlet pipe having an first inlet coupled to the conveying means and a second inlet coupled to a source of hot process air, the second inlet including baffles for imparting a swirl to the process air as it flows into the inlet pipe for mixing with the granulated sulfur to aid in dispersing the granulated sulfur against the ceramic balls of the sulfur furnace.

12. The flue gas conditioning system of claim 11 wherein the sulfur furnace further includes a stainless steel grate extending transversely across the interior of the inner shell for holding the ceramic balls.

13. A flue gas conditioning system for conditioning the flue gas flowing in a flue duct from a boiler to an electrostatic precipitator by injecting sulfur trioxide into the flue gas upstream of the electrostatic precipitator, comprising:

a. a source of granulated sulfur;

b. a sulfur furnace for combusting the granulated sulfur to generate sulfur dioxide, the sulfur furnace comprising a hollow shell defining a cavity therein with an array of ceramic balls disposed in the cavity wherein the granulated sulfur is dispersed as it enters into the sulfur furnace and oxidizes directly into sulfur dioxide;

c. a pneumatic conveyor coupled to the granulated sulfur source and to the sulfur furnace for conveying the granulated sulfur from the granulated sulfur source to the sulfur furnace;

d. a catalytic converter coupled to the sulfur furnace for generating sulfur trioxide from the sulfur dioxide generated by the sulfur furnace, the catalytic converter receiving sulfur dioxide from the sulfur furnace at sufficient pressure to force the sulfur dioxide through the catalytic converter to generate sulfur trioxide; and e. a plurality of injection probes mounted in the flue duct upstream of the electrostatic precipitator and coupled to the catalytic converter for injecting sulfur trioxide into the flue gas.

14. The flue gas conditioning system of claim 13 and further including an inlet pipe coupled between an inlet of the sulfur furnace and the pneumatic conveyor, the inlet pipe having a first inlet coupled to the pneumatic conveyor and a second inlet coupled to a source of hot process air, the second inlet including baffles for imparting a swirl to the process air as it flows into the inlet pipe for mixing with the granulated sulfur to aid in dispersing the granulated sulfur against the ceramic balls of the sulfur furnace.

15. The flue gas conditioning system of claim 13 wherein the granulated sulfur comprises sulfur in the form of any of powder, prill, flake, pellets, and BB's.

16. The flue gas conditioning system of claim 13 wherein the granulated sulfur source includes means for maintaining the granulated sulfur in an inert environment.

17. A flue gas conditioning system for conditioning flue gas flowing in a plurality of flue ducts by injecting sulfur trioxide into the flue gas, each flue duct coupling a boiler to an electrostatic precipitator, comprising:

a. a source of granulated sulfur;

b. a plurality of sulfur furnaces for combusting the granulated sulfur to generate gaseous sulfur dioxide;

c. a day hopper for holding a supply of granulated sulfur located in proximity to each sulfur furnace, each day hopper coupled to the sulfur furnace located in proximity to it for supplying granulated sulfur to the sulfur furnace;

d. transport means for transporting granulated sulfur from the granulated sulfur source to each day hopper;

e. each sulfur furnace coupled to a catalytic converter, each catalytic converter generating sulfur trioxide from the sulfur dioxide generated by the sulfur furnace to which it is coupled, and each catalytic converter receiving sulfur dioxide from the sulfur furnace at sufficient pressure to force the sulfur dioxide through the catalytic converter to generate sulfur trioxide; and f. each flue duct having a plurality of injection probes mounted thereto upstream of the electrostatic precipitator to which that flue duct is coupled, each plurality of injection probes coupled to one of the catalytic converters such that each catalytic converter is coupled to an individual set of the probes.

18. A method of conditioning flue gas flowing in a flue from a flue from a boiler to an electrostatic precipitator, the method comprising the steps of:

a. providing a source of granulated sulfur;

b. transporting said granulated sulfur from said source of granulated sulfur to a sulfur furnace;

c. combusting said granulated sulfur in said sulfur furnace to generate gaseous sulfur dioxide at sufficient pressure to force the sulfur dioxide through a densely packed catalytic converter to generate sulfur trioxide;

d. catalyzing said sulfur dioxide into sulfur trioxide;

e. injecting said sulfur trioxide into the flue gas.

\* \* \* \* \*